(12) United States Patent
Bao et al.

(10) Patent No.: US 10,972,576 B2
(45) Date of Patent: Apr. 6, 2021

(54) CONTENT ACCELERATION FOR CROSS-SITE RESOURCES BY CDN

(71) Applicant: International Business Machines Corporation, Armonk, NY (US)

(72) Inventors: Lei Bao, Wuxi (CN); Liang Rong, Suzhou (CN); Gang Tang, Nanjing (CN); Ming Shuang Xian, Wuxi (CN)

(73) Assignee: International Business Machines Corporation, Armonk, NY (US)

(*) Notice: Subject to any disclaimer, the term of this patent is extended or adjusted under 35 U.S.C. 154(b) by 13 days.

(21) Appl. No.: 16/190,668

(22) Filed: Nov. 14, 2018

(65) Prior Publication Data

US 2020/0153932 A1    May 14, 2020

(51) Int. Cl.
*H04L 29/08* (2006.01)
*G06F 16/957* (2019.01)

(52) U.S. Cl.
CPC ...... *H04L 67/2852* (2013.01); *G06F 16/9574* (2019.01); *H04L 67/02* (2013.01); *H04L 67/2847* (2013.01)

(58) Field of Classification Search
CPC .. H04L 67/02; H04L 67/2847; G06F 16/9574
See application file for complete search history.

(56) References Cited

U.S. PATENT DOCUMENTS

| | | | | |
|---|---|---|---|---|
| 7,133,905 | B2* | 11/2006 | Dilley | H04L 29/06 709/219 |
| 7,653,689 | B1* | 1/2010 | Champagne | H04L 67/1063 709/206 |
| 8,645,494 | B1 | 2/2014 | Atiman et al. | |
| 8,972,461 | B2 | 3/2015 | Lewin et al. | |
| 9,015,348 | B2 | 4/2015 | Hofmann et al. | |
| 9,191,369 | B2* | 11/2015 | Bharadhwaj | H04L 67/327 |
| 9,237,480 | B2 | 1/2016 | Ludwig et al. | |
| 9,332,090 | B1* | 5/2016 | Fallows | H04L 69/04 |
| 9,736,258 | B2* | 8/2017 | Holland | H04L 67/34 |
| 9,838,497 | B2* | 12/2017 | Lawrence | H04L 67/1014 |
| 9,917,908 | B1* | 3/2018 | Knecht | H04L 63/126 |
| 10,114,882 | B2* | 10/2018 | Lipstone | H04L 65/4084 |
| 10,361,902 | B2* | 7/2019 | Cai | G06F 11/00 |
| 10,693,979 | B2* | 6/2020 | Knecht | G06F 21/645 |

(Continued)

OTHER PUBLICATIONS

"Cloudflare CDN: A Global Content Delivery Network with Unique Performance Optimization Capabilities," Cloudflare <https://www.cloudflare.com/static/media/pdf/cloudflare-whitepaper-cdn.pdf>, 2017, 9 pgs.

(Continued)

*Primary Examiner* — Lashonda T Jacobs
(74) *Attorney, Agent, or Firm* — Jared C. Chaney

(57) ABSTRACT

In some embodiments, the present disclosure provides for accelerating cross-sited resources in an accelerated document. In some embodiments, a set of rules is created to determine which cross-site resources will be accelerated. Using the rules, a first cross-site resource is selected for acceleration. The cross-site resource is cached on a CDN edge server. A link for a first cross-site resource is wrapped so that a client will be directed to retrieve the cross-site resource from the CDN edge server. The client receives the cross-site resource directly from the CDN edge server.

20 Claims, 7 Drawing Sheets

(56) References Cited

U.S. PATENT DOCUMENTS

| | | | | |
|---|---|---|---|---|
| 10,733,376 B2* | 8/2020 | Halai | | G06F 21/602 |
| 2009/0165124 A1* | 6/2009 | Spektor | | H04L 63/104 |
| | | | | 726/21 |
| 2011/0029899 A1* | 2/2011 | Fainberg | | G06F 12/0862 |
| | | | | 715/760 |
| 2011/0145435 A1* | 6/2011 | Bhatawdekar | | G06F 21/64 |
| | | | | 709/238 |
| 2012/0254421 A1* | 10/2012 | Gagliardi | | G06F 16/958 |
| | | | | 709/224 |
| 2013/0132833 A1* | 5/2013 | White | | G06F 11/3438 |
| | | | | 715/704 |
| 2014/0281892 A1* | 9/2014 | Baldwin | | G06F 40/186 |
| | | | | 715/234 |
| 2015/0143223 A1* | 5/2015 | Kolam | | H04L 69/329 |
| | | | | 715/234 |
| 2015/0310126 A1* | 10/2015 | Steiner | | G06F 40/14 |
| | | | | 715/204 |
| 2015/0319189 A1* | 11/2015 | Maher | | H04L 63/1466 |
| | | | | 726/22 |
| 2015/0365465 A1 | 12/2015 | Devanneaux et al. | | |
| 2016/0156700 A1* | 6/2016 | Chen | | H04L 63/10 |
| | | | | 726/3 |
| 2016/0351231 A1* | 12/2016 | Woods | | G11B 27/28 |
| 2017/0331667 A1* | 11/2017 | Cai | | H04L 61/1511 |
| 2018/0239794 A1* | 8/2018 | Hill | | G06F 16/23 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

CONTENT ACCELERATION FOR CROSS-SITE RESOURCES BY CDN

BACKGROUND

Aspects of the present disclosure relate to network servers, more particular aspects relate to content delivery networks.

A content delivery network or content distribution network (CDN) is a geographically distributed network of servers and their data centers. The goal is to distribute service relative to the location of end-users to provide content faster than is normally available from the data center. CDNs serve a significant percentage of the Internet content today, including web objects (text, graphics, and scripts), downloadable objects (media files, software, documents), applications (e-commerce, portals), live streaming media, on-demand streaming media, and social media sites.

BRIEF SUMMARY

The present disclosure provides a method, computer program product, and system of content acceleration for cross-site resources by CDN. In some embodiments, the method includes receiving cross-site rules for a web asset, wherein the web asset contains a first link to a first cross-site resource, distributing, by a content delivery network (CDN), the cross-site rules to a first CDN edge server, determining, based on the cross-site rules, that the first cross-site resource will be accelerated, wrapping, by a processor, the first link of the first cross-site resource in the web asset at the first CDN edge server, caching, by the first CDN edge server based on the determination that a first cross-site resource should be accelerated, the first cross-site resource at the first CDN edge server, and sending, to a client by the processor, the first cross-site resource directly from the first CDN edge server.

Some embodiments of the present disclosure can also be illustrated by a computer program product comprising a computer readable storage medium having program instructions embodied therewith, the program instructions executable by a computer to cause the computer receive cross-site rules for a web asset, wherein the web asset contains a first link to a first cross-site resource, distribute, by a content delivery network (CDN), the cross-site rules to a first CDN edge server, determine, based on the cross-site rules, that the first cross-site resource will be accelerated, wrapping, by a processor, the first link of the first cross-site resource in the web asset at the first CDN edge server, cache, by the first CDN edge server based on the determination that a first cross-site resource should be accelerated, the first cross-site resource at the first CDN edge server, and send, to a client by the processor, the first cross-site resource directly from the first CDN edge server.

In some embodiments, the system includes a processor, and a memory in communication with the processor, the memory containing program instructions that, when executed by the processor, are configured to cause the processor to perform a method. The method includes receiving cross-site rules for a web asset, wherein the web asset contains a first link to a first cross-site resource, distributing, by a content delivery network (CDN), the cross-site rules to a first CDN edge server, determining, based on the cross-site rules, that the first cross-site resource will be accelerated, wrapping, by a processor, the first link of the first cross-site resource in the web asset at the first CDN edge server, caching, by the first CDN edge server based on the determination that a first cross-site resource should be accelerated, the first cross-site resource at the first CDN edge server, and sending, to a client by the processor, the first cross-site resource directly from the first CDN edge server.

DETAILED DESCRIPTION

In order to provide content to a user faster, a content delivery network (CDN) is commonly used to deliver a web asset and some content linked to in the web asset. A CDN is a geographically distributed network of proxy servers that deliver content locally to users. An exemplary CDN may have a host node (e.g., a source of a resource or a web server) and edge nodes which cache a resource for delivery to a client computer. In some CDN systems other intervening nodes may also used. The edge nodes or edge servers may cache content from the host node or host server to provide content to users faster if the users are closer to an edge node than the host node. For the purpose of this disclosure, providing content from an edge node or a CDN edge server will be referred to as acceleration. Content that is provided from an edge node or a CDN edge server will be referred to content that is accelerated.

Some web assets, hosted at a first host node and accelerated using a CDN, will contain both content that is also hosted at the first host node that is accelerated using the CDN and cross-sited content that is hosted at a second host node and not accelerated using the CDN. Cross-siting resources is a mechanism that uses additional headers (such as HTTP headers) to tell a browser to let a web asset from a first server have permission to access selected resources from a different server. A web asset (e.g., a web application, a web page, or a web document) makes a cross-siting request when it requests a resource that has a different origin (e.g., domain, protocol, and/or port) other than its own origin. A web asset may be hosted on web server A. However, the web asset may contain some items, such as images, that are hosted on web server A and some items that are hosted on web server B. If the content from web server A is accelerated using a CDN, the content in the web asset hosted at web server B may not be accelerated. This can lead to a lag time in loading the content hosted on web server B since it is not accelerated.

In some embodiments, the present disclosure provides for accelerating cross-sited resources in an accelerated document. In some embodiments, a set of rules is created to determine which cross-site resources will be accelerated. Using the rules, a first cross-site resource is selected for acceleration. The cross-site resource is cached on a CDN edge server. A link for a first cross-site resource is wrapped so that a client will be directed to retrieve the cross-site resource from the CDN edge server. The client receives the cross-site resource directly from the CDN edge server.

Figure 1:
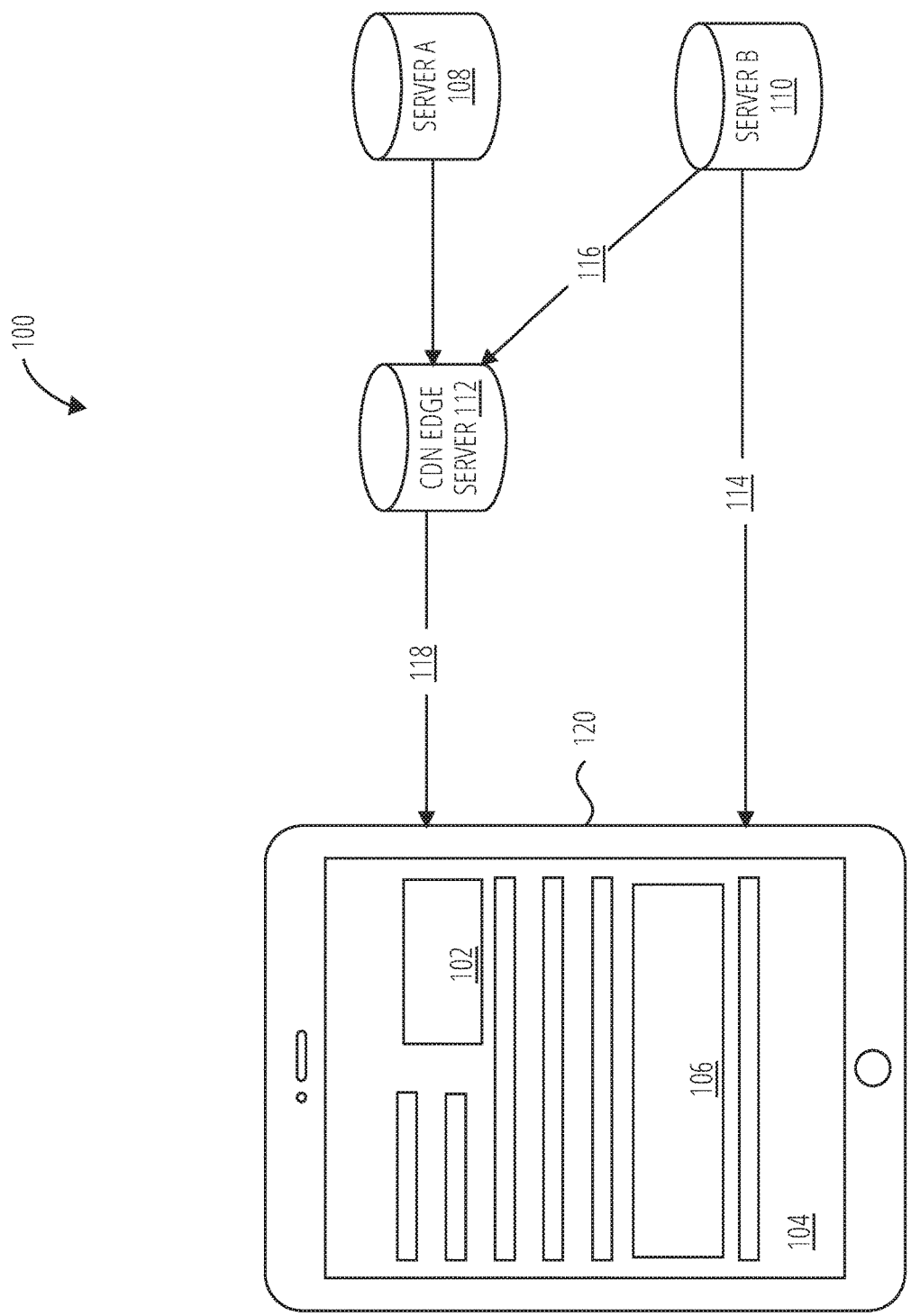
FIG. 1 is a block diagram illustrating components of a CDN according to various embodiments of the present invention.

Referring to FIG. 1, in some embodiments a client device 120 requests a web asset 104. Web asset 104 and/or resource 102 (e.g., an image or a video) are hosted on server A 108. CDN edge server 112 is configured to accelerate at least some contents of server A 108 including web asset 104 and resource 102. Web asset 104 and/or resource 102 are provided to client device 120 through connection 118. In some embodiments, resource 106 is hosted on server B 110. Web asset 104 contains a cross-site link to resource 106 such that client device 120 can access resource 106 through connection 114.

In some embodiments, a set of rules is provided to CDN edge server 112. The set of rules are used by CDN edge server 112 to determine which cross-sited resources in web asset 104 are to be accelerated. In some embodiments, it will be determined that resource 106 should be accelerated. CDN edge server 112 will wrap a link for resource 106 and provide that link (e.g., a wrapped URL) to client device 120 in or with web asset 104. In some embodiments, CDN edge server 112 receives resource 106 through connection 116 and will cache a copy of resource 106 at CDN edge server 112. In some embodiments, client device 120 will use the wrapped link to retrieve resource 106 from CDN edge server 112 through connection 118. In some embodiments, client device 120 is geographically closer to CDN edge server 112 than server B 110 and connection 118 is geographically shorter than connection 114. In some embodiments, connection 118 between client device 120 and CDN edge server 112 is faster than connection 114 between server B 110 and client device 120. In some embodiments, the cross-site rules comprise one or more rules to determine if the first cross-site resource should be wrapped based on an average speed of retrieval from a source web server.

Figure 2:
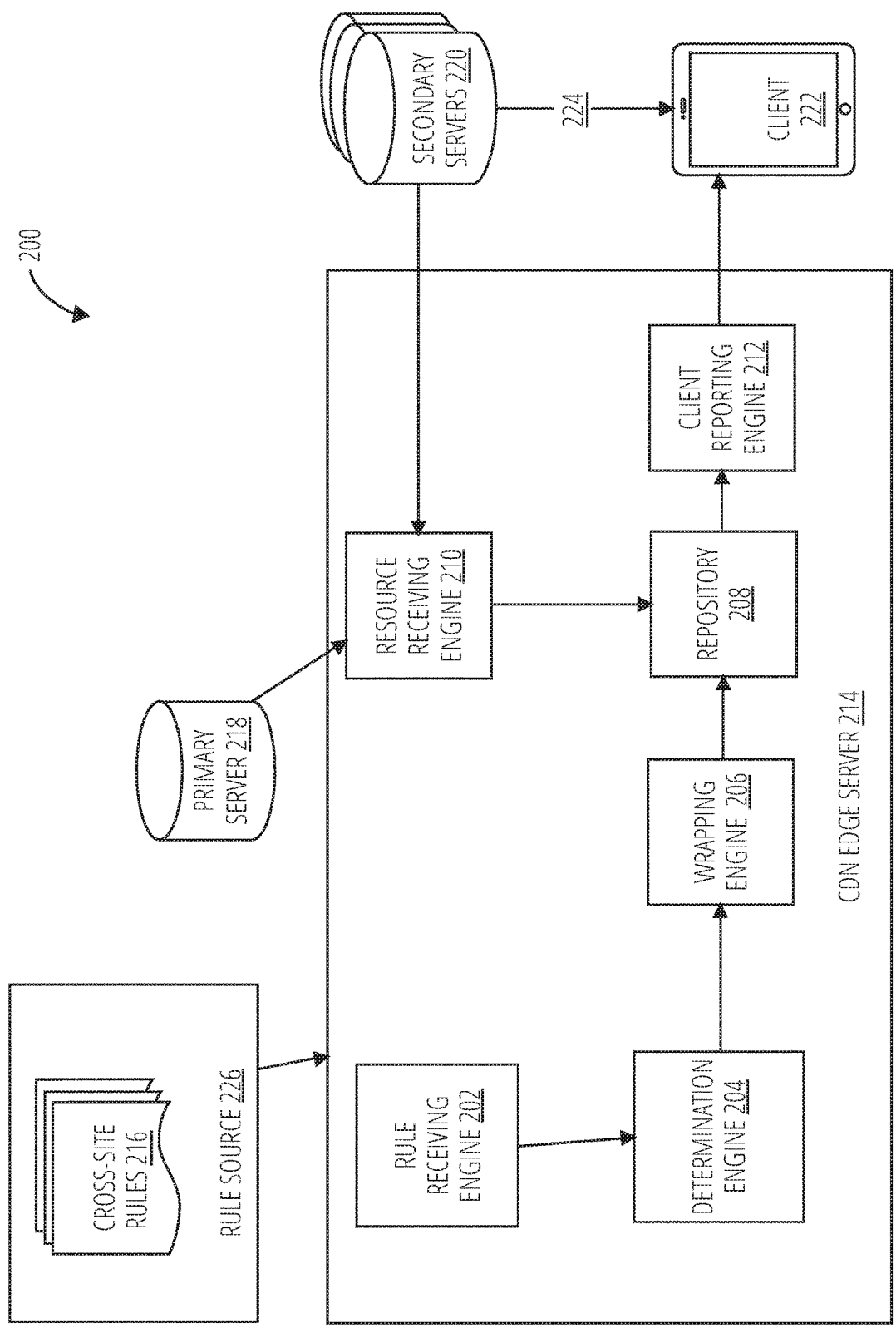
FIG. 2 illustrates a multiple server network attached to a user system according to various embodiments of the present invention.

Referring to FIG. 2, in some embodiments, a content acceleration system 200 includes a CDN edge server 214, a rule source 226, a primary server 218, one or more secondary servers 220, and a client device 222. In some embodiments, CDN edge server 214 includes rule receiving engine 202, determination engine 204, wrapping engine 206, resource receiving engine 210, repository 208, and client reporting engine 212. In some embodiments, rule source 226 could be a controlling entity of a web asset. For example, rule source 226 could be a web page designer, a server hosting the web asset, an owner of the web asset, etc. In some embodiments, rule source 226 could be any third party. For example, rule source 226 could be client 222, a network provider, or an entity that controls CDN edge server 214. In some embodiments, primary server 218 is a source of a web asset. In some embodiments, one or more secondary servers 220 contain resources cross-sited in the web asset. In some embodiments, connection 224 is a direct connection from one or more secondary servers 220 to client 222. In some embodiments, client 222 is the requestor of the web asset.

In some embodiments, primary server 218 could provide the web asset to CDN edge server 214. CDN edge server 214 caches the web asset in repository 208. In some embodiments, the web asset could contain some items that are hosted on primary server 218 but cashed in repository 208. For example, the web asset could have links to a cache for a second cross-site resource in repository 208 from primary server 218. In some embodiments, the web asset contains some items that are hosted on one or more secondary servers 220.

In some embodiments, rule receiving engine 202 will receive cross-site rules 216 from rule source 226. For example, the owner of a web resource could create a set of cross-site rules 216 for cross-siting a web resource to distribute to CDN edge servers (such as CDN edge server 214). In some embodiments, the rules determine which cross-site resources provide a system of determination for which resources should be accelerated and or which resource links should be wrapped. In some embodiments, resources will be accelerated based on the number of times the resource is accessed, the size of the resource, the importance of the resource, the value of the resource, a ranking provided by the content owner, a ranking provided by a web asset owner, a ranking provided by a third party, a lag time in accessing the resource from a host server, or other metrics. For example, the cross-site rules 216 could include a direction to accelerate all cross-site resources, or it could prioritize cross-site resources based on an importance value. The importance value could be based on a designer set metric such as how important a resource is to a user's understanding of the web resource content. The importance value could also be based on a financial metric, such as advertisement revenue generation, subscription services, or value to subscribers. In an example, the cross-site rules 216 could prioritize one or more advertisements on a web resource based on the number of times users, connected to CDN edge server 214, clicked on each of the one or more advertisements. The rules could then cause the CDN edge server 214 to accelerate the advertisements with the most clicks. In some embodiments, the rules will also contain a threshold value related to an importance value. For example, the threshold value could be ten clicks per day and any advertisement content that receives more than ten clicks per day could be accelerated.

Figure 3:
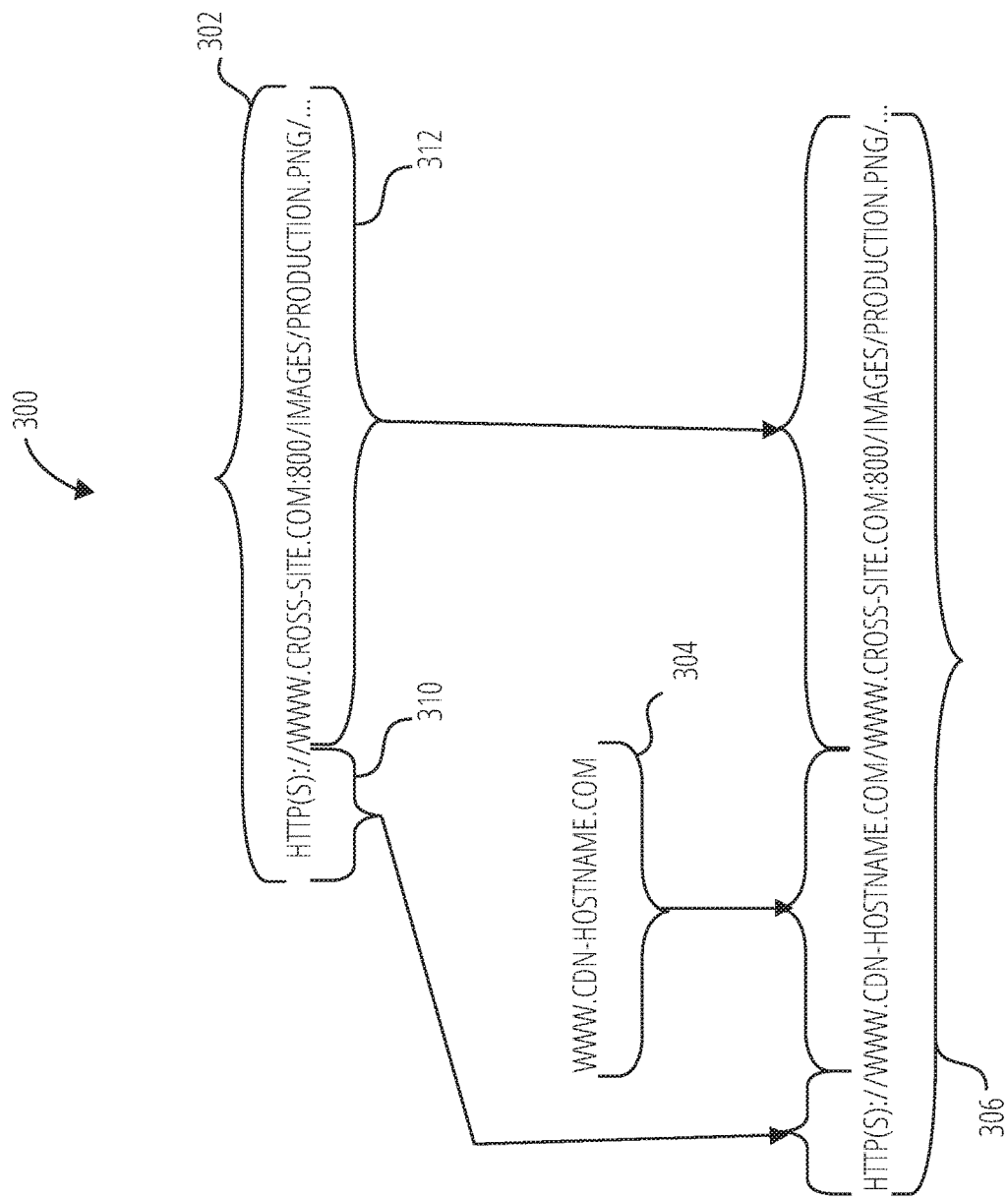
FIG. 3 illustrates an example of wrapping a cross-site URL according to various embodiments of the present invention.

In some embodiments, determination engine 204 will determine which cross-site resources will be accelerated based on the cross-site rules 216. Determination engine 204 will identify a first cross-site resource to be accelerated and will mark a link connected to the first cross-site resource for wrapping by wrapping engine 206. In some embodiments, wrapping updates the link to the cross-sited resource in the web asset so that a user using the updated web asset will retrieve the first cross-site resource from CDN edge server 214 instead of one of the secondary servers 220 through connection 224. For example, FIG. 3 demonstrates a process 300 for wrapping a link. As illustrated in FIG. 3, a first cross-site resource could have a cross-site Uniform Resource Locator (URL) 302 and CDN edge server 214 could have a CDN hostname 304. Wrapping engine 206 could combine CDN hostname 304 with cross-site URL 302 to make a wrapped URL 306. This combination could keep the scheme 310 ("http(s)://" in this case), the cross-site hostname and uniform resource identifier (URI) 312 and insert CDN hostname 304. In some embodiments, wrapped URL 306 replaces cross-site URL 302 in an updated web asset provided to the user.

In some embodiments, the resource receiving engine 210 will receive the web asset from primary server 218 and a first cross-site resource from one or more of the secondary servers 220. In some embodiments, multiple cross-site resources will be received from multiple servers of the secondary servers 220. In some embodiments, once the first cross-site resource is received by resource receiving engine 210 it will be stored or cached in the repository 208 along with the updated web asset from primary server 218 and any other resources from primary server 218 that are to be cached.

In some embodiments, upon a request from client 222, client reporting engine 212 will provide the updated web asset to client 222 where the updated web asset contains wrapped URL 306 in place of cross-site URL 302. Based on wrapped URL 306 contained in the updated web asset, the user will request the first cross-site resource from the CDN edge server 214 instead of from a server in secondary servers 220 through connection 224.

Figure 4:
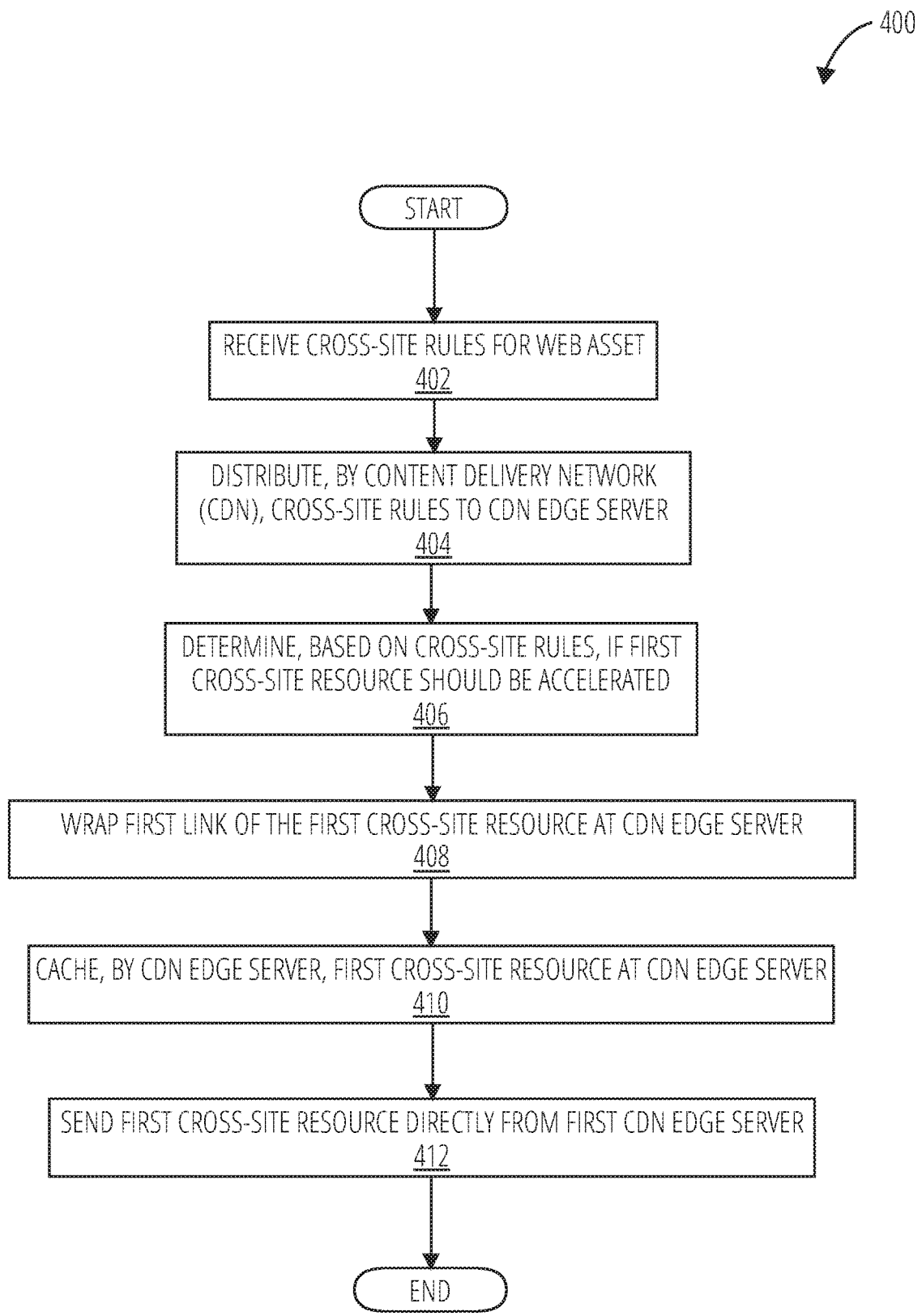
FIG. 4 illustrates an example method for accelerating a cross-site resource with a CDN according to various embodiments of the present invention.

FIG. 4 illustrates an example embodiment of a method 400 by which cross-sited content may be accelerated. Method 400 may be beneficial in providing rules that are used to select what cross-sited content to accelerate and accelerating the selected cross-sited content.

In some embodiments, referring to FIG. 4, in block 402 cross-site rules for a web asset are received. In some embodiments, the cross-site rules are received by a CDN. For example, the cross-site rules could be received by a processor in a CDN.

In block 404, the cross-site rules are distributed to a CDN edge server. In some embodiments, cross-site rules will be distributed to all CDN edge servers in the CDN. In some embodiments, the cross-site rules will be distributed to a selection of CDN edge servers. For example, the rules could be distributed based on a geographic region or based on the traffic at one or more servers. In some embodiments, a CDN can be logically connected through a network connection such as a cloud computing system.

In block 406, routine 400 determines, based on the cross-site rules, if a first cross-site resource should be accelerated. In some embodiments, a content acceleration system, (e.g., content acceleration system 100) will identify potential cross-site resources that could be accelerated. In some embodiments, the content acceleration system 100 will rank the potential cross-site resources based on an importance of acceleration. In some embodiments, the content acceleration system 100 will select one or more cross-site resources for acceleration, such as a first cross-site resource.

In block 408, a first cross-site resource link is wrapped at the CDN edge server. In some embodiments, the wrapping can be any function which can direct a client to retrieve a resource from a CDN edge server where the resource is cached or stored.

In block 410, the CDN edge server caches the first cross-site resource at the CDN edge server. In some embodiments, the cross-site rules direct the CDN edge server to cache a first cross-site resource. In some embodiments, the cross-site rules will direct the CDN edge server to cache a first cross-site resource but not other cross-site resources.

In block 412 the CDN edge server sends the first cross-site resource directly to the client. In some embodiments, the client will use a wrapped URL in a web asset provided by the CDN edge server to access a first cross-site resource directly from the CDN instead of an original host server for the first cross-site resource.

Computer System

Figure 5:
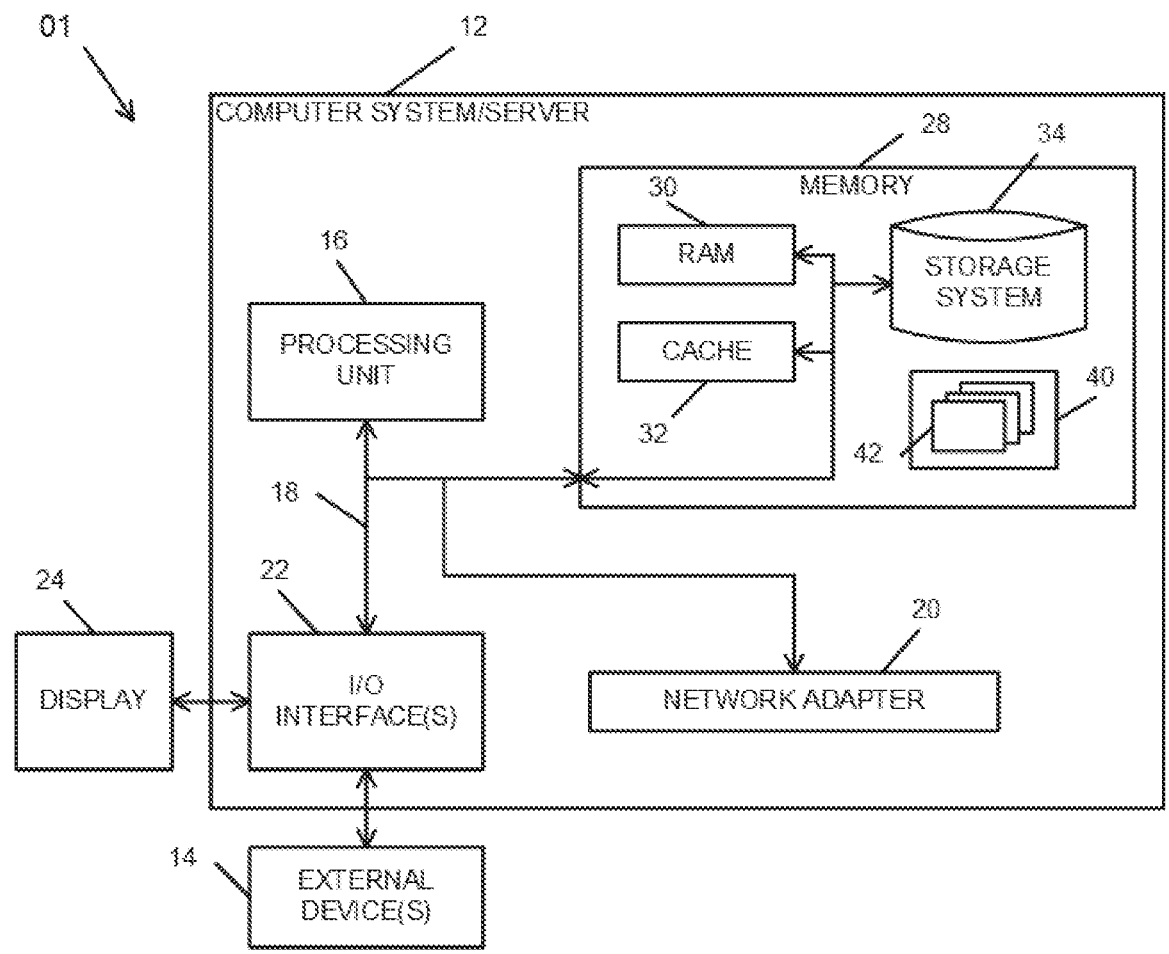
FIG. 5 depicts a computer system according to various embodiments of the present invention.

In an exemplary embodiment, the computer system is a computer system 01 as shown in FIG. 5. Computer system 01 is only one example of a computer system and is not intended to suggest any limitation as to the scope of use or functionality of embodiments of the present invention. Regardless, computer system 01 is capable of being implemented to perform and/or performing any of the functionality/operations of the present invention.

Computer system 01 includes a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 12 may be described in the general context of computer system-executable instructions, such as program modules, being executed by a computer system. Generally, program modules may include routines, programs, objects, components, logic, and/or data structures that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in computer system 01 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions/operations of embodiments of the invention.

Program/utility 40, having a set (at least one) of program modules 42, may be stored in memory 28 by way of example, and not limitation. Exemplary program modules 42 may include an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention.

Computer system/server 12 may also communicate with one or more external devices 14 such as a keyboard, a pointing device, a display 24, one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
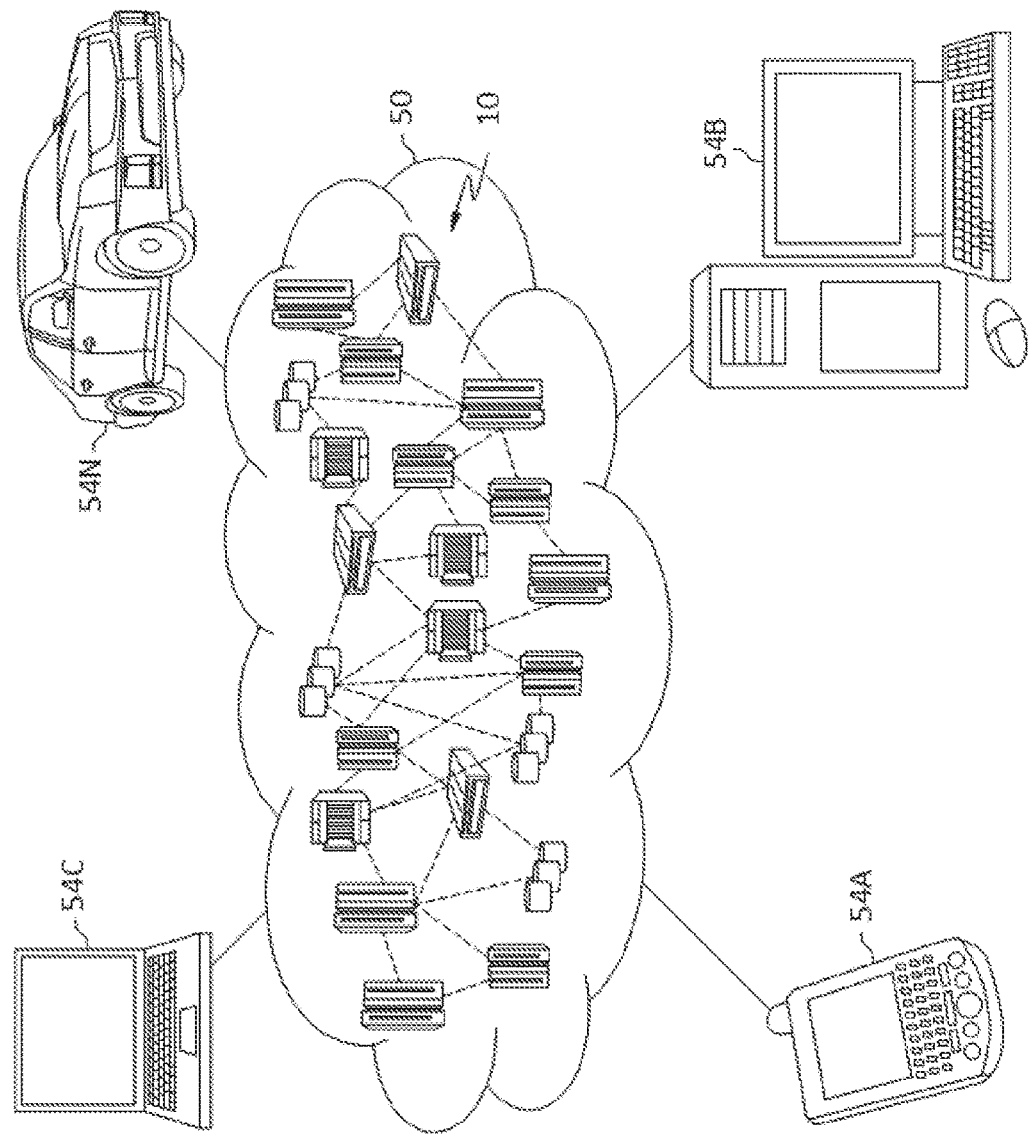
FIG. 6 depicts a cloud computing environment according to various embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
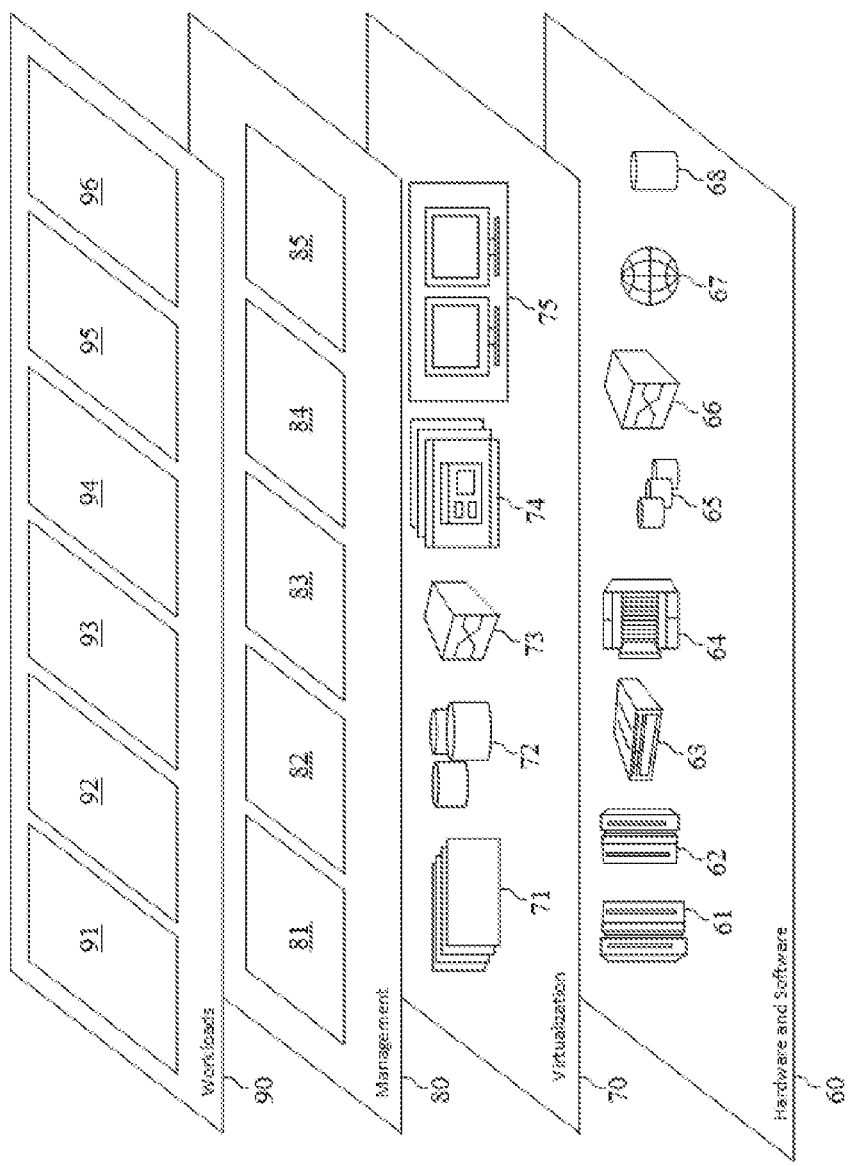
FIG. 7 depicts abstraction model layers according to various embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictive neural networks 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   receiving cross-site rules for a web asset,
      wherein the web asset contains a first link to a first cross-site resource;
   distributing, by a content delivery network (CDN), the cross-site rules to a first CDN edge server;
   determining, based on the cross-site rules, that the first cross-site resource will be accelerated;
   wrapping, by a processor, the first link of the first cross-site resource in the web asset at the first CDN edge server;
   caching, by the first CDN edge server based on the determination that a first cross-site resource should be accelerated, the first cross-site resource at the first CDN edge server;
   receiving, by the first CDN edge server, a request for the first cross-site resource;
   determining, based on the receiving that the first cross-site resource has been cached at the time the request is received; and
   sending, to a client by the processor, the first cross-site resource directly from the first CDN edge server.

2. The method of claim 1 wherein the cross-site rules are distributed to a plurality of CDN edge servers in the CDN by a cloud.

3. The method of claim 1 wherein the wrapping further comprises:
   combining a cross-site URL for the first cross-site resource with a hostname for the CDN edge server to create a wrapped URL.

4. The method of claim 1 wherein the cross-site rules comprise one or more rules to determine if the first cross-site resource should be wrapped based on an importance value of the first cross-site resource.

5. The method of claim 1 wherein the cross-site rules comprise one or more rules to determine if the first cross-site resource should be wrapped based on an average speed of retrieval from a second source server.

6. The method of claim 1 wherein the web asset contains cross-site resources and resources.

7. The method of claim 1 wherein the cross-site rules are set by a web asset administrator.

8. The method of claim 1 wherein the cross-site rules are set by the client.

9. The method of claim 1 wherein all cross-site resources in the web asset are wrapped.

10. The method of claim 1 further comprising determining if the first link should be wrapped.

11. The method of claim 1 wherein the web asset contains a second link to a second cross-site resource cached on the CDN edge server.

12. The method of claim 1 further comprising
generating, based on the wrapping, an updated web asset by replacing the first link to the first cross-site resource with a second link to the cross-sited resource, wherein the second link is the wrapped first link;
caching, by the CDN edge server, an updated web asset based on the wrapping, and
sending, by the processor, an updated web asset to the client directly from the CDN edge server.

13. The method of claim 12 further comprising:
sending, by the processor, a third resource to the client directly from the CDN edge server,
wherein the web asset is cached by the CDN edge server, and
wherein the third resource is not cross-sited.

14. The method of claim 12 further comprising:
receiving, by the processor, the web asset,
wherein the web asset is hosted by a first source server;
wherein the first cross-site resource is hosted by a second source server; and
wherein the first link is a link to the first cross-site resource on the second source server.

15. A computer program product, the computer program product comprising a computer readable storage medium having program instructions embodied therewith, the program instructions executable by a computer to cause the computer to:
receive cross-site rules for a web asset,
wherein the web asset contains a first link to a first cross-site resource;
distribute, by a content delivery network (CDN), the cross-site rules to a first CDN edge server;
determine, based on the cross-site rules, that the first cross-site resource will be accelerated;
wrapping, by a processor, the first link of the first cross-site resource in the web asset at the first CDN edge server;
cache, by the first CDN edge server based on the determination that the first cross-site resource should be accelerated, the first cross-site resource at the first CDN edge server;
receive, by the first CDN edge server, a request for the first cross-site resource;
determine, based on the receiving that the first cross-site resource has been cached at a time the request is received; and
send, to a client by the processor, the first cross-site resource directly from the first CDN edge server.

16. A system comprising:
a processor; and
a memory in communication with the processor, the memory containing program instructions that, when executed by the processor, are configured to cause the processor to perform a method, the method comprising:
receive cross-site rules for a web asset,
wherein the web asset contains a first link to a first cross-site resource;
distribute, by a content delivery network (CDN), the cross-site rules to a first CDN edge server;
determine, based on the cross-site rules, that the first cross-site resource will be accelerated;
wrap, by the processor, the first link of the first cross-site resource in the web asset at the first CDN edge server;
cache, by the first CDN edge server based on the determination that the first cross-site resource should be accelerated, the first cross-site resource at the first CDN edge server;
receive, by the first CDN edge server, a request for the first cross-site resource; determine, based on the receiving that the first cross-site resource has been cached at a time the request is received; and
send, to a client by the processor, the first cross-site resource directly from the first CDN edge server.

17. The system of claim 16 wherein the cross-site rules are distributed to a plurality of CDN edge servers in the CDN by a cloud.

18. The system of claim 16 wherein the wrapping further comprises:
combining a cross-site URL for the first cross-site resource with a hostname for the CDN edge server to create a wrapped URL.

19. The system of claim 16 wherein the cross-site rules comprise one or more rules to determine if the first cross-site resource should be wrapped based on an importance value of the first cross-site resource.

20. The system of claim 16 wherein the cross-site rules comprise one or more rules to determine if the first cross-site resource should be wrapped based on an average speed of retrieval from a second source server.

* * * * *